(12) United States Patent
Jones (10) Patent No.: US 7,987,424 B2
(45) Date of Patent: *Jul. 26, 2011

(54) IMPLEMENTING A SECOND COMPUTER SYSTEM AS AN INTERFACE FOR A FIRST COMPUTER SYSTEM

(75) Inventor: Jeffrey Allen Jones, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1052 days.

This patent is subject to a terminal disclaimer.

(21) Appl. No.: 11/768,196

(22) Filed: Jun. 26, 2007

(65) Prior Publication Data

US 2007/0250653 A1   Oct. 25, 2007

Related U.S. Application Data

(63) Continuation of application No. 10/351,566, filed on Jan. 23, 2003, now Pat. No. 7,266,774.

(51) Int. Cl.
*G06F 3/00* (2006.01)
(52) U.S. Cl. .................. 715/733; 715/748
(58) Field of Classification Search ............ 715/733, 715/744, 740, 736, 748–749, 715–719, 864; 709/253; 710/303
See application file for complete search history.

(56) References Cited

U.S. PATENT DOCUMENTS

| | | | |
|---|---|---|---|
| 4,430,728 A | 2/1984 | Beitel et al. | |
| 5,049,863 A | 9/1991 | Oka | |
| 5,157,769 A | 10/1992 | Eppley et al. | |
| 5,321,817 A | 6/1994 | Feinstein | |
| 5,438,671 A | 8/1995 | Miles | |
| 5,504,864 A | 4/1996 | Berg | |
| 5,600,800 A | 2/1997 | Kikinis et al. | |
| 5,640,302 A | 6/1997 | Kikinis | |
| 5,726,684 A | 3/1998 | Blankenship et al. | |
| 5,793,355 A | 8/1998 | Youens | |
| 5,793,957 A | 8/1998 | Kikinis et al. | |
| 5,812,870 A * | 9/1998 | Kikinis et al. | 712/32 |
| 5,822,230 A | 10/1998 | Kikinis et al. | |
| 5,861,873 A | 1/1999 | Kikinis | |
| 5,870,617 A * | 2/1999 | Walsh et al. | 713/324 |
| 5,878,211 A * | 3/1999 | Delagrange et al. | 726/34 |
| 5,886,686 A | 3/1999 | Chen | |
| 5,948,047 A | 9/1999 | Jenkins et al. | |
| 5,949,643 A | 9/1999 | Batio | |
| 5,964,847 A | 10/1999 | Booth, III et al. | |
| 6,009,247 A * | 12/1999 | Canora et al. | 710/100 |
| 6,029,215 A | 2/2000 | Watts, Jr. et al. | |

(Continued)

FOREIGN PATENT DOCUMENTS

CN   200000131666   5/2002

(Continued)

*Primary Examiner* — Steven P Sax
(74) *Attorney, Agent, or Firm* — Matthew W. Baca; Amy J. Pattillo (57) ABSTRACT

A second independent computer system is docked into a first computer system. Then, the first computer system uses at least one of an input interface and an output interface of the second independent computer system as a peripheral device for interfacing with the first computer system. While the second independent computer system is undocked from the first computer system at least one of the input interface and the output interface of the second independent computer system are peripheral devices for interfacing solely with the second independent computer system.

8 Claims, 6 Drawing Sheets

U.S. PATENT DOCUMENTS

| | | | |
|---|---|---|---|
| 6,035,350 A | 3/2000 | Swamy et al. | |
| 6,049,453 A | 4/2000 | Hulsebosch | |
| 6,166,722 A | 12/2000 | Kawabe et al. | |
| 6,211,876 B1 | 4/2001 | Ackermann et al. | |
| 6,309,230 B2 | 10/2001 | Helot | |
| 6,359,994 B1 | 3/2002 | Markow et al. | |
| 6,538,880 B1 | 3/2003 | Kamijo et al. | |
| 6,791,580 B1 | 9/2004 | Abbott et al. | |
| 6,920,616 B1 | 7/2005 | Abbott et al. | |
| 6,971,063 B1 | 11/2005 | Rappaport et al. | |
| 7,010,634 B2 | 3/2006 | Silvester | |
| 7,266,774 B2 * | 9/2007 | Jones | 715/733 |
| 2001/0042150 A1 | 11/2001 | Moroz et al. | |
| 2002/0035484 A1 * | 3/2002 | McCormick | 705/2 |
| 2002/0091877 A1 | 7/2002 | Karidis | |
| 2003/0065734 A1 | 4/2003 | Ramkakesavan | |
| 2003/0154291 A1 * | 8/2003 | Ocheltree et al. | 709/228 |
| 2004/0019724 A1 * | 1/2004 | Singleton et al. | 710/303 |
| 2004/0024656 A1 * | 2/2004 | Coleman | 705/27 |
| 2004/0093418 A1 * | 5/2004 | Tuomi | 709/228 |
| 2004/0210933 A1 * | 10/2004 | Dresti et al. | 725/40 |
| 2006/0041542 A1 * | 2/2006 | Hull et al. | 707/3 |

FOREIGN PATENT DOCUMENTS

| | | |
|---|---|---|
| JP | 7-219749 | 8/1995 |
| JP | 9-101842 | 4/1997 |
| JP | 10-83335 | 3/1998 |
| JP | 10-187280 | 7/1998 |
| JP | 11-272367 | 10/1999 |
| JP | 11-305868 | 11/1999 |
| JP | 2000-20474 | 1/2000 |
| JP | 2001-101140 | 4/2001 |
| JP | 2001-142563 | 5/2001 |
| WO | 00/31608 | 6/2000 |

* cited by examiner

IMPLEMENTING A SECOND COMPUTER SYSTEM AS AN INTERFACE FOR A FIRST COMPUTER SYSTEM

CROSS-REFERENCE TO RELATED APPLICATIONS:

This application is a continuation of commonly assigned U.S. patent application Ser. No. 10/351566, filed Jan. 23, 2003, which is hereby incorporated herein by reference.

BACKGROUND OF THE INVENTION

1. Technical Field

The present invention relates in general to data processing systems and, in particular, to interfacing for independent computer systems. Still more particularly, the present invention relates to using a second independent computer system as an input or output interface for a first computer system.

2. Description of the Related Art

The development of portable electronics devices includes personal digital assistants (PDAs), portable wireless telephony devices, portable electronic writing tablets, portable electronic book devices, personal portable gaming systems, and a variety of other devices designed with portability in mind. Basically, a portable electronics device is a computer system designed with a specific purpose. Most portable electronics devices do not include all the hardware functions of a larger computer system, such as a desktop computer or laptop computer. In particular, larger computer systems typically include more memory and greater processing power than a portable electronic device. Therefore, many portable electronics devices are designed to connect to another computer system in some manner. For example, a portable electronics device may connect to another computer system to access data and software.

A typical portable electronics device is a personal digital assistant (PDA). PDA's often include a port for connecting with a larger computer system loaded with PDA specified software. A user may enter an address directly to the PDA or may enter the address at the larger computer system running the PDA specified software. The larger computer system, upon receiving a request to synchronize data with the PDA, compares the data on the PDA with the PDA data input to the larger computer system and transfers data to synchronize the data between the systems. Synchronization of the data on a PDA with the data on a larger computer system is an advantageous feature. There is a need, however, to provide further interfacing between a larger computer system and a PDA. For example, there is a need to utilize the input interfaces and input processing available on a PDA as inputs to a larger computer system. Further, while PDAs provide great functionality to the user independently, PDAs should enhance the functionality of a larger computer system. For example, there is a need for improved security in access to data on larger computer systems, where a PDA might be used as a key to access the data in the computer system.

SUMMARY OF THE INVENTION

A second independent computer system is docked into a first computer system. Then, the first computer system uses at least one of an input interface and an output interface of the second independent computer system as a peripheral device for interfacing with the first computer system. While the second independent computer system is undocked from the first computer system at least one of the input interface and the output interface of the second independent computer system are peripheral devices for interfacing solely with the second independent computer system.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The present invention may be executed in a variety of systems, including a variety of computing systems and electronic devices under a number of different operating systems. In one embodiment of the present invention, the computing system is a portable electronic device such as a palmtop computer, a personal digital assistant, a telephone device or other electronic computing system that may also incorporate communications features that provide for telephony, enhanced telephony, messaging and information services. The computing system, however, may also be a notebook computer, a tablet computer, a desktop computer, a network computer, a midrange computer, a server system or a mainframe computer. Therefore, in general, the present invention is preferably executed in a computer system that performs computing tasks such as manipulating data in storage that is accessible to the computer system. In addition, the computer system preferably includes at least one output device and at least one input device.

Figure 1:
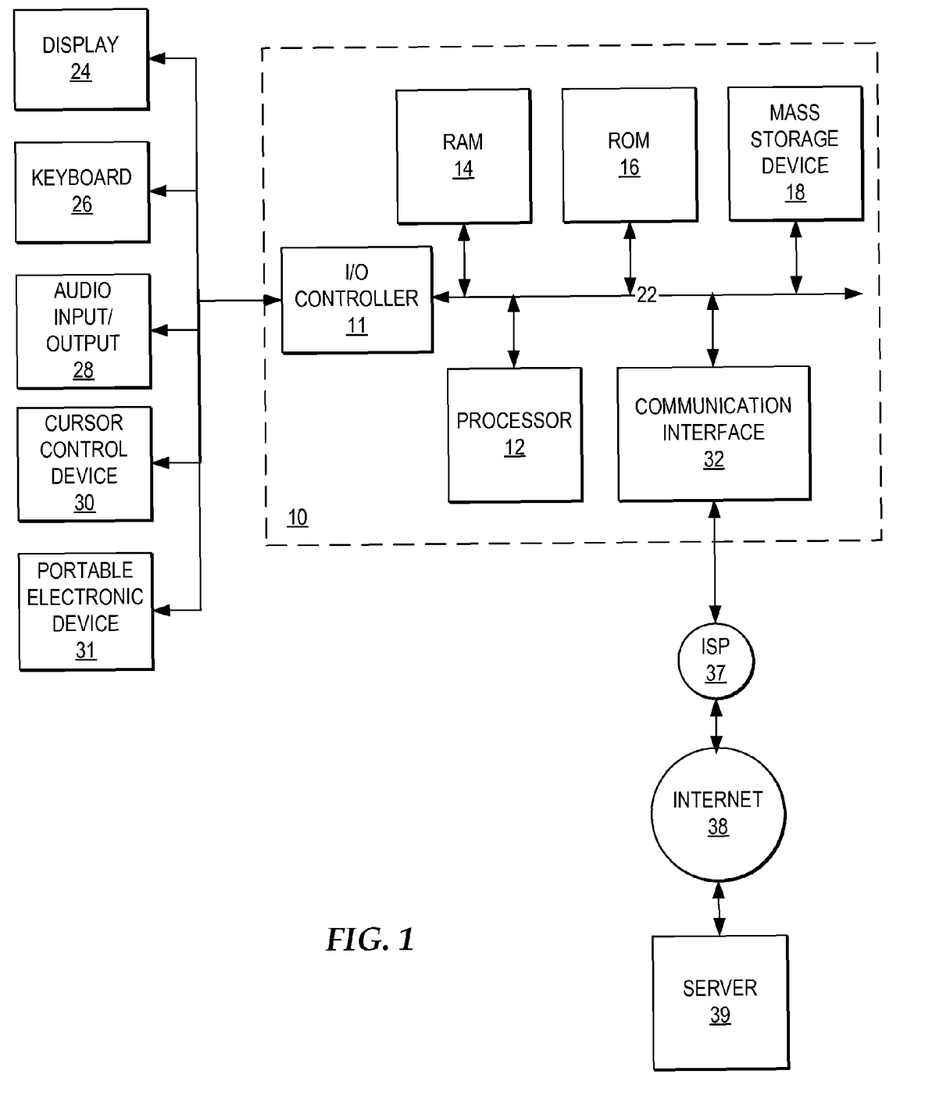
FIG. 1 depicts one embodiment of a computer system with which the method, system and program of the present invention may be utilized.

Referring now to the drawings and in particular to FIG. 1, there is depicted one embodiment of a computer system with which the method, system and program of the present invention may advantageously be utilized. Computer system 10 includes a bus 22 or other communication device for communicating information within computer system 10, and at least one processing device such as processor 12, coupled to bus 22 for processing information. Bus 22 preferably includes low-latency and higher latency paths that are connected by bridges and controlled within computer system 10 by multiple bus controllers.

Processor 12 may be a general-purpose processor such as IBM's PowerPC™ processor that, during normal operation, processes data under the control of operating system and application software stored in a dynamic storage device such as random access memory (RAM) 14 and a static storage device such as Read Only Memory (ROM) 16. The operating system preferably provides a graphical user interface (GUI) to the user. In a preferred embodiment, application software contains machine executable instructions that when executed on processor 12 carry out the operations depicted in the flowchart of FIGS. 6 and 7, and others described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 10 to perform a process according to the present invention. The term "machine-readable medium" as used herein includes any medium that participates in providing instructions to processor 12 or other components of computer system 10 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 10 can read and which is suitable for storing instructions. In the present embodiment, an example of a non-volatile medium is mass storage device 18. Volatile media include dynamic memory such as RAM 14. Transmission media include coaxial cables, copper wire or fiber optics, including the wires that comprise bus 22. Transmission media can also take the form of acoustic or light waves, such as those generated during radio frequency or infrared data communications.

Moreover, the present invention may be downloaded as a computer program product, wherein the program instructions may be transferred from a remote computer such as a server 39 to requesting computer system 10 by way of data signals embodied in a carrier wave or other propagation medium via a network link 34 (e.g., a modem or network connection) to a communications interface 32 coupled to bus 22. Communications interface 32 provides a two-way data communications coupling to network link 34 that may be connected, for example, to a local area network (LAN), wide area network (WAN), or as depicted herein, directly to an Internet Service Provider (ISP) 37. In particular, network link 34 may provide wired and/or wireless network communications to one or more networks.

ISP 37 in turn provides data communication services through the Internet 38 or other network. Internet 38 may refer to the worldwide collection of networks and gateways that use a particular protocol, such as Transmission Control Protocol (TCP) and Internet Protocol (IP), to communicate with one another. ISP 37 and Internet 38 both use electrical, electromagnetic, or optical signals that carry digital data streams. The signals through the various networks and the signals on network link 34 and through communication interface 32, which carry the digital data to and from computer system 10, are exemplary forms of carrier waves transporting the information.

Further, multiple peripheral components may be added to computer system 10, connected to an input/output (I/O) controller 11 coupled to bus 22. It will be understood that multiple types of ports, slots, and modules may be controlled by I/O controller 11. For example, an audio input/output device 28 is attached to I/O controller 11 for controlling audio input through a microphone or other sound or lip motion capturing device and for controlling audio output through a speaker or other audio projection device. A display 24 is also attached to I/O controller 11 for providing visual, tactile or other graphical representation formats. A keyboard 26 and cursor control device 30, such as a mouse, trackball, or cursor direction keys, are coupled to I/O controller 11 as interfaces for user inputs to computer system 10. A portable electronic device 31 is attached to I/O controller 11 for multiple purposes. Portable electronic device 31 may synchronize data with computer system 10 or receive downloaded information from computer system 10. In addition, portable electronic device 31 may act as an interface for user inputs to computer system 10. Further, portable electronic device 31 may be charged via the power supply available to computer system 10. In alternate embodiments of the present invention, additional input and output peripheral components may be added.

Figure 2:
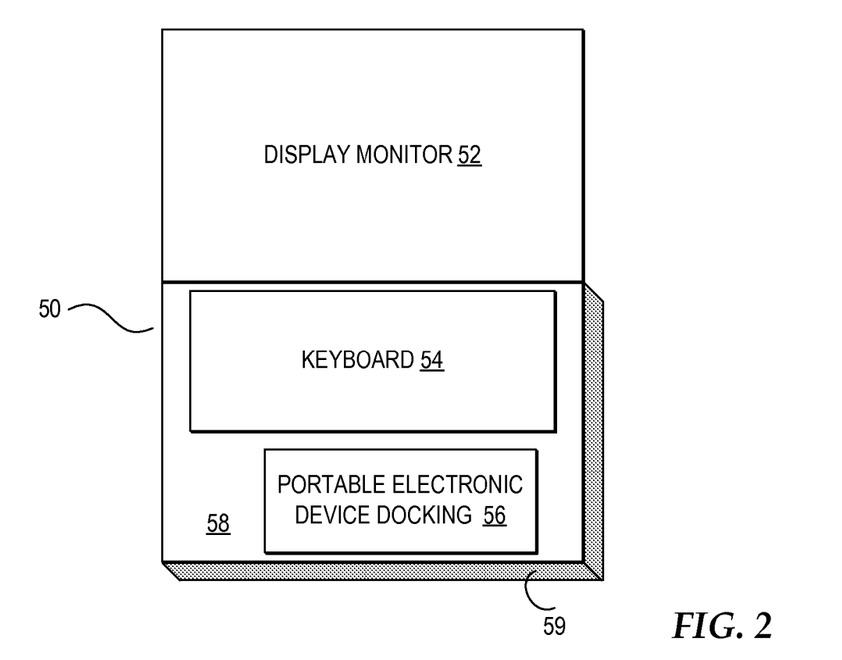
FIG. 2 depicts a block diagram of a computer system with an internal docking system for a portable electronic device, in accordance with the method, system, and program of the present invention.

With reference now to FIG. 2, there is depicted a block diagram of a computer system with an internal docking system for a portable electronic device, in accordance with the method, system, and program of the present invention. As depicted, a portable computer system 50, similar to computer system 10 of FIG. 1, includes as peripheral devices a display monitor 52 and a keyboard 54. It will be understood that portable computer system 50 may include multiple types of computer systems with multiple types of features, such as a laptop computer or a portable electronic device.

In addition, portable computer system 50 includes a portable electronic device docking space 56. Portable electronic device docking space 56 may allow for sliding a portable electronic device from the top side 58 of the base of portable computer system 50 or through one of the lateral sides 59 of the base of computer system 10. The portable electronic device docking space 56 is adaptable to connect to multiple types, sizes and shapes of portable electronic devices. In an alternate embodiment, portable computer system 50 may support docking spaces for multiple portable electronic devices.

Within portable electronic device docking space 56, portable computer system 50 may establish a connection with a portable electronic device through an electronic, infrared, or other type of data transmission connection. In addition, within portable electronic device docking space 56, computer system 50 may establish a power connection with a portable electronic device. Alternatively, portable electronic device docking space 56 may merely provide a structural support for the placement of a portable electronic device, where the portable electronic device establishes data and power connections to computer system 50 via cables or another type of connector independent of portable electronic device docking space 56.

Figure 3:
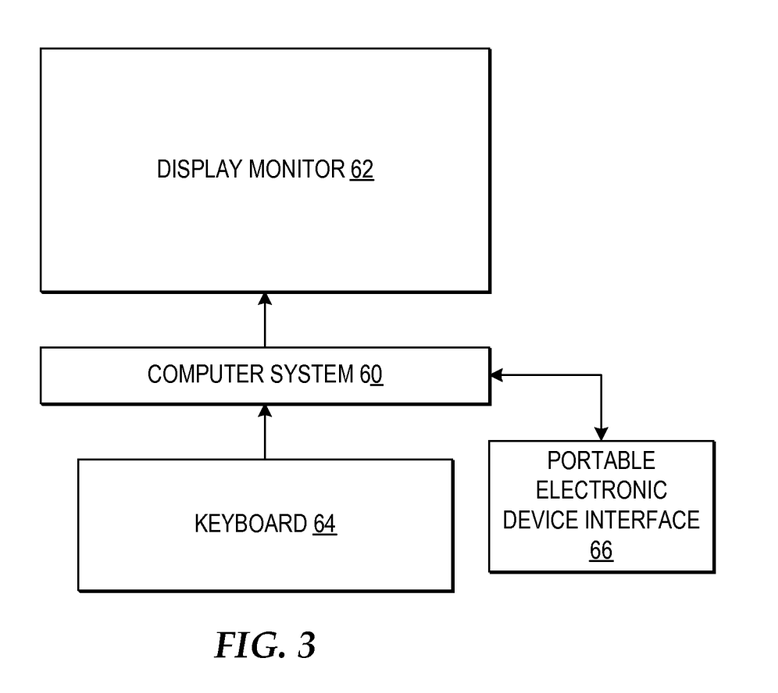
FIG. 3 depicts a block diagram of a computer system with an external docking system for a portable electronic device, in accordance with the method, system, and program of the present invention.

Referring now to FIG. 3, there is illustrated a block diagram of a computer system with an external docking system for a portable electronic device, in accordance with the method, system, and program of the present invention. As illustrated, computer system 60, similar to computer system 10 of FIG. 1, includes as peripheral devices a display monitor 62 and a keyboard 64.

In addition, a portable electronic device interface 66 is accessible from computer system 10. Portable electronic device interface 66 may comprise a fixed port or additional hardware connected to a port. Portable electronic device interface 66 is adaptable to connect to multiple types and sizes of portable electronic devices. Further, portable electronic device interface 66 may provide both a data connection and power supply to a portable electronic device. In an alternate embodiment, computer system 60 may support multiple portable electronic device interfaces. Further, the portable electronic device interface may be built into another peripheral device, such as a keyboard or a monitor.

Figure 4:
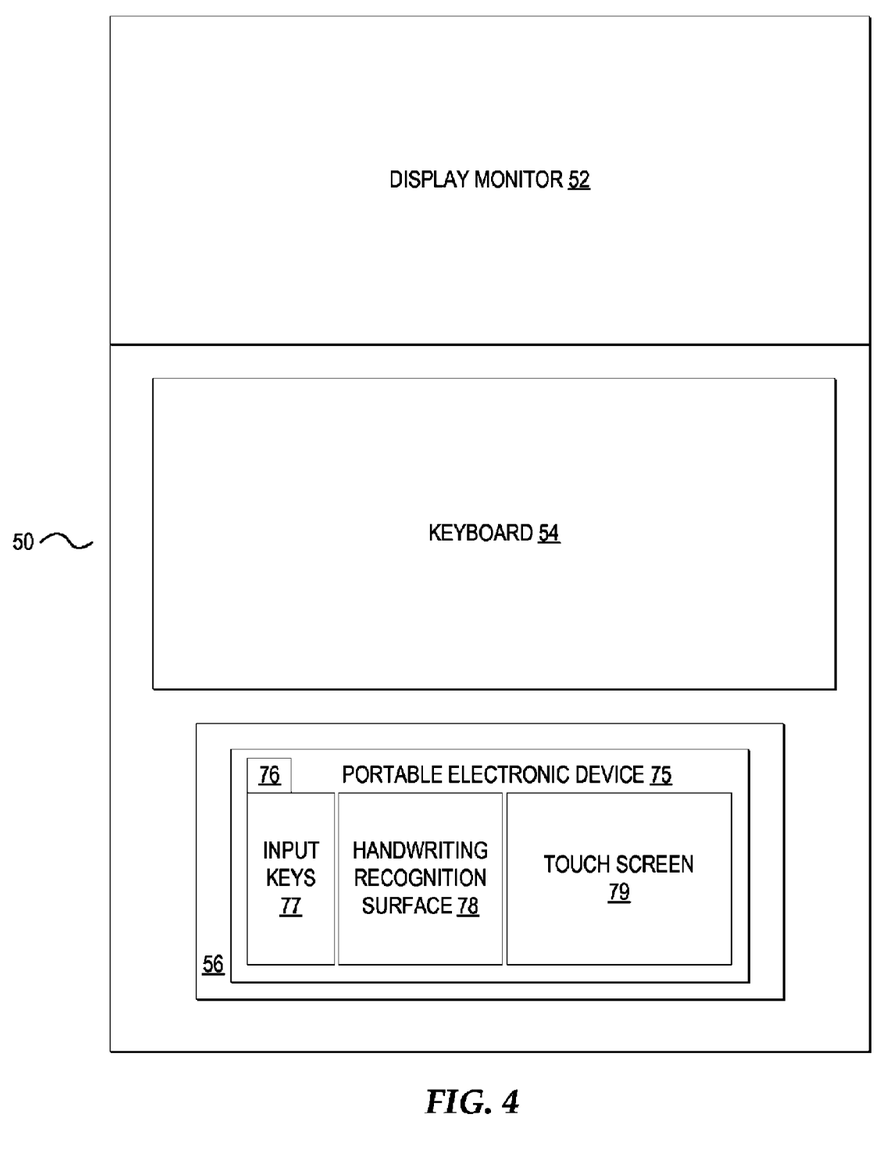
FIG. 4 depicts a block diagram of the computer system of FIG. 2 with a portable electronic device as an input device, in accordance with the method, system, and program of the present invention.

With reference now to FIG. 4, there is depicted a block diagram of the computer system of FIG. 2 with a portable electronic device as an input device, in accordance with the method, system, and program of the present invention. As illustrated, portable electronic device 75 is inserted in computer system 50. The features of portable electronic device 75 include input keys 77, handwriting recognition surface 78, and touch screen 79. In an alternate embodiment, portable electronic device 75 may include other features. Input keys 77 may include, but are not limited to, depressable keys, a scroll tool, and other adjustable keys. A handwriting recognition surface 78 is enabled to detect handwritten symbols, such that portable electronic device can translate the handwritten symbol into a letter, number or other character. A touch screen 79 detects applied pressure and movement. Portable electronic device 75 translates the position of pressure applied to touch screen 79 into a cursor control entry.

Preferably, portable electronic device 75 is enabled to switch between multiple modes while inserted in computer system 50. A user may provide an input to computer system 50 or portable electronic device 75 to request modes of operation. In the example, a user may select one of the modes of operation by pressing an input key 76. With each depression of input key 76, portable electronic device 75 cycles to the next mode. In one of these modes, portable electronic device 75 may be set in an input/output mode such that inputs received at portable electronic device 75 are received as inputs intended for controlling computer system 50, not inputs for operating portable electronic device 75. Further, in input/output mode, portable electronic device 75 may receive information from computer system 50 for output via an output interface.

While in input/output mode, the functionality of portable electronic device 75 for processing inputs and outputs is still required. In input/output mode, for example, a symbol detected on handwriting recognition surface 78 is translated by portable electronic device 75 into a character and received by computer system 50 as input, as if, for example, from a keyboard or voice entry tool. In another example, pressure and movement detected on touch screen 79 are translated by portable electronic device 75 into cursor control movement and received by computer system 50 as input, as if, for example, from a mouse or other cursor controller. It will be understood, that in an alternate embodiment of the present invention, portable electronic device 75 may provide other types of interfaces, the inputs to which are translated by portable electronic device 75 and transferred to computer system 50 as inputs from a peripheral device. In addition, it will be understood that computer system 50 may transfer output data to portable electronic device 75, such that any output interfaces of portable electronic device 75 are utilized as part of another peripheral output interface available to computer system 50.

While portable electronic device 75 is operating in a synchronization mode, computer system 50 is also enabled to synchronize data with portable electronic device 75, download data to portable electronic device 75, and upload data from portable electronic device 75. Software executing on computer system 50 may provide an interface for entering data synchronizable with data on portable electronic device 75. In addition, computer system 50 may access software and data via a network connection and download that software or data to portable electronic device 75. Advantageously, where computer system 50 supports docking of multiple portable electronic devices, computer system 50 may synchronize the data between each of the devices.

Many portable electronic devices utilize rechargeable batteries. Computer system 50 is also enabled to recharge portable electronic device 75 while it is inserted in portable electronic device docking space 56. Recharge may occur in parallel with operation of portable electronic device 75 is one of the described modes of operation. Computer system 50, however, may need to manage when recharging is available. For example, if computer system 50 is also running off battery power alone, then computer system 50 may disengage recharging unless a user requests recharging.

Further, as a security measure, computer system 50 includes a mode of operation, during which computer system 50 will only operate if an authorized portable electronic device is inserted into portable electronic device docking space 56. Thus, portable electronic device 75 may act as a key for access to computer system 50. In particular, portable electronic device 75 may be the only input device allowed for accessing computer system 50.

Portable electronic device 50 may be identified, for example, by the security identification number embedded in the processor affixed within portable electronic device 50. In addition, multiple authorized portable electronic devices may be selected for key access to computer system 50 according to identification number, user name, or other criteria. Further, portable electronic device 75 may act as a key without which the user is only allowed access to certain software and data accessible from computer system 50. In addition, if an unauthorized portable electronic device is inserted into computer system for use, computer system 50 will attempt to locate whether the owner of computer system 50 is logged into the network from another computer system and send a message indicating unauthorized use.

Alternatively, to implement security in access to computer system 50, computer system 50 may require that a user pass the security requirements of portable electronic device 75 before access to computer system 50 is allowed. For example, the security functions for access to portable electronic device 75 may include matching a finger scan or other biometric input. By implementing secured access to computer system 50 according to the security features of portable electronic device 75, only portable electronic device 75 has to be updated to take advantage of advances in security technology.

Figure 5:
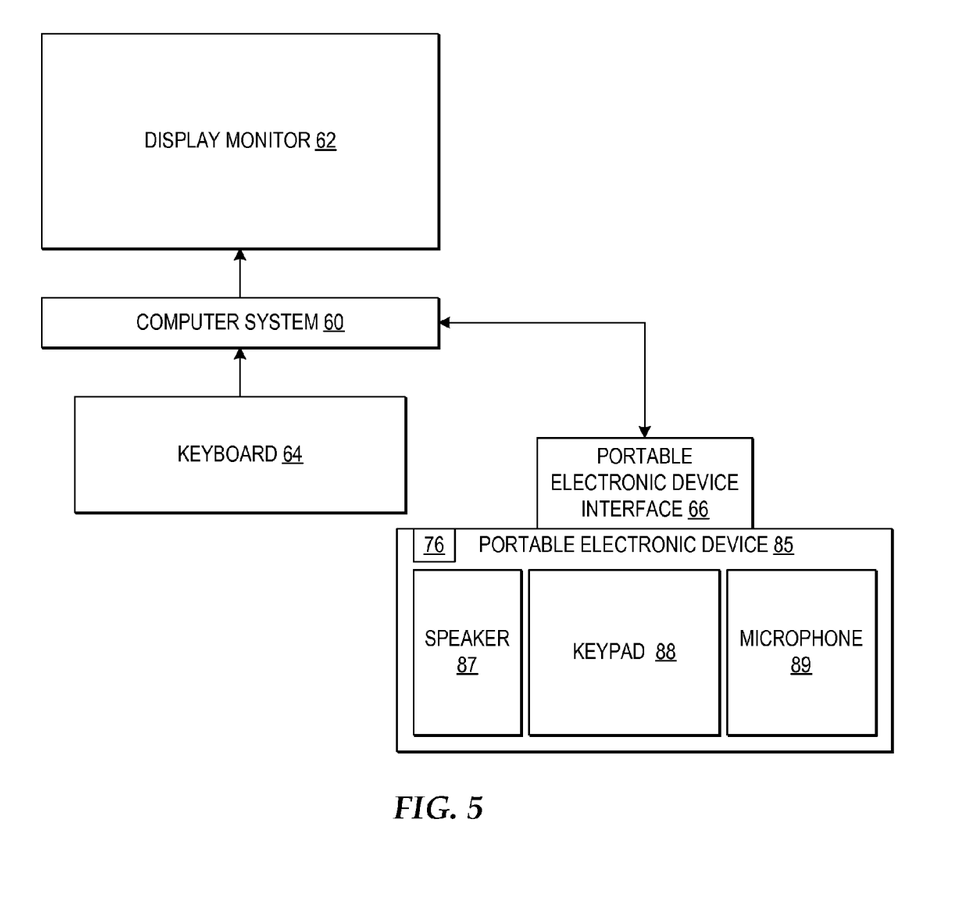
FIG. 5 depicts a block diagram of the computer system of FIG. 3, with a portable electronic device as an input device, in accordance with the method, system, and program of the present invention.

Referring now to FIG. 5, there is illustrated a block diagram of the computer system of FIG. 3, with a portable electronic device as an input device, in accordance with the method, system, and program of the present invention. As depicted, portable electronic device 85 is connected to portable electronic device interface 66 through an electronic, infrared, or other type of data transfer link. Further, portable electronic device 85 may be connected to portable electronic device interface 66 to receive power. Computer system 60 is enabled to interact with portable electronic device 85, in a manner similar to the interaction between portable electronic device 75 and computer system 50 described in FIG. 4. For example, a user may switch between modes of operation by depressing input key 76.

Portable electronic device 85 includes a speaker 87, a keypad 88, and a microphone 89. Preferably, portable electronic device 85 can be set in an input/output mode where inputs to portable electronic device 85 are received as inputs to computer system 60, rather than inputs intended to control the operation of portable electronic device independently. Further, output data detected at portable electronic device 85 is received as information for output via the output interface of portable electronic device 85. For example, in the input/output mode, computer system 60 will recognize portable electronic device 85 as a microphone peripheral, a speaker system and a keypad device.

In addition, in the input/output mode, portable electronic device 85 may need to process and translate data for output or input. For example, portable electronic device 85 may include voice recognition features for purposes of voice dialing. While in the input/output mode, portable electronic device may implement the voice recognition feature to match speech to a voice entry stored in portable electronic device. The voice entry indicates the name of a person that can be transferred to computer system 10 as a text input of a name. Computer system 10, in a messaging program, may match the textual name with a messaging address and initiate a network based communication with that person. It will be understood, that in alternate embodiments, both the input and output devices and functions of portable electronic device 85 are available to computer system 60.

Figure 6:
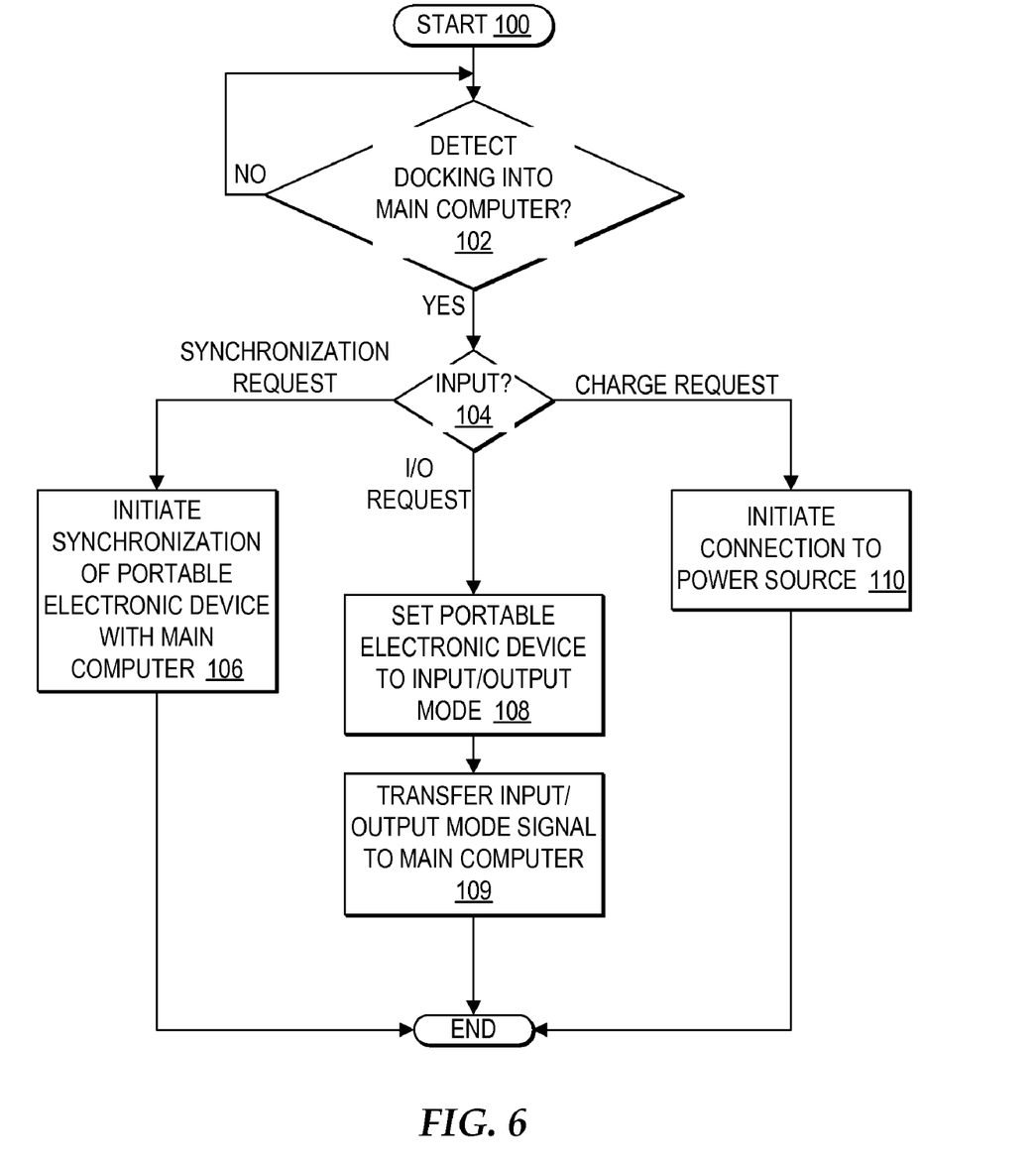
FIG. 6 depicts a high level logic flowchart of a process and program for controlling a portable electronic device in accordance with the method, system, and program of the present invention.

With reference now to FIG. 6, there is depicted a high level logic flowchart of a process and program for controlling a portable electronic device in accordance with the method, system, and program of the present invention. As illustrated, the process starts at block 100 and thereafter proceeds to block 102. Block 102 depicts a determination as to whether the portable electronic device detects docking or connection with a main computer. If there is no detection, then the process iterates at block 102. If there is a detection of a connection, then the process passes to block 104.

Block 104 illustrates a determination as to what type of input is received when an input is received. If a synchronization request is received, then the process passes to block 106. Block 106 depicts initiating a synchronization of the portable electronic device with the main computer by sending a synchronization signal to the main computer. The main computer and the portable electronic device will then transfer data, including software downloads from the main computer system to the portable electronic device, and the process ends.

If an input/output request is received, then the process passes to block 108. Block 108 depicts setting the portable electronic device to an input/output mode. In input/output mode, portable electronic device receives inputs as an input interface for controlling the main computer. Further, in input/output mode, portable electronic device receives signals from the main computer as output signals to an output interface. Next, block 109 illustrates transferring an input/output mode signal to the main computer so that the main computer will recognize the portable electronic device as an input/output interface, and the process ends.

If a charge request is initiated, then the process passes to block 110. Block 110 depicts initiating a connection to a power source, and the process ends. If a power source is not available from the main computer, the process may initiate a warning output for display to the user that recharging is not occurring.

Figure 7:
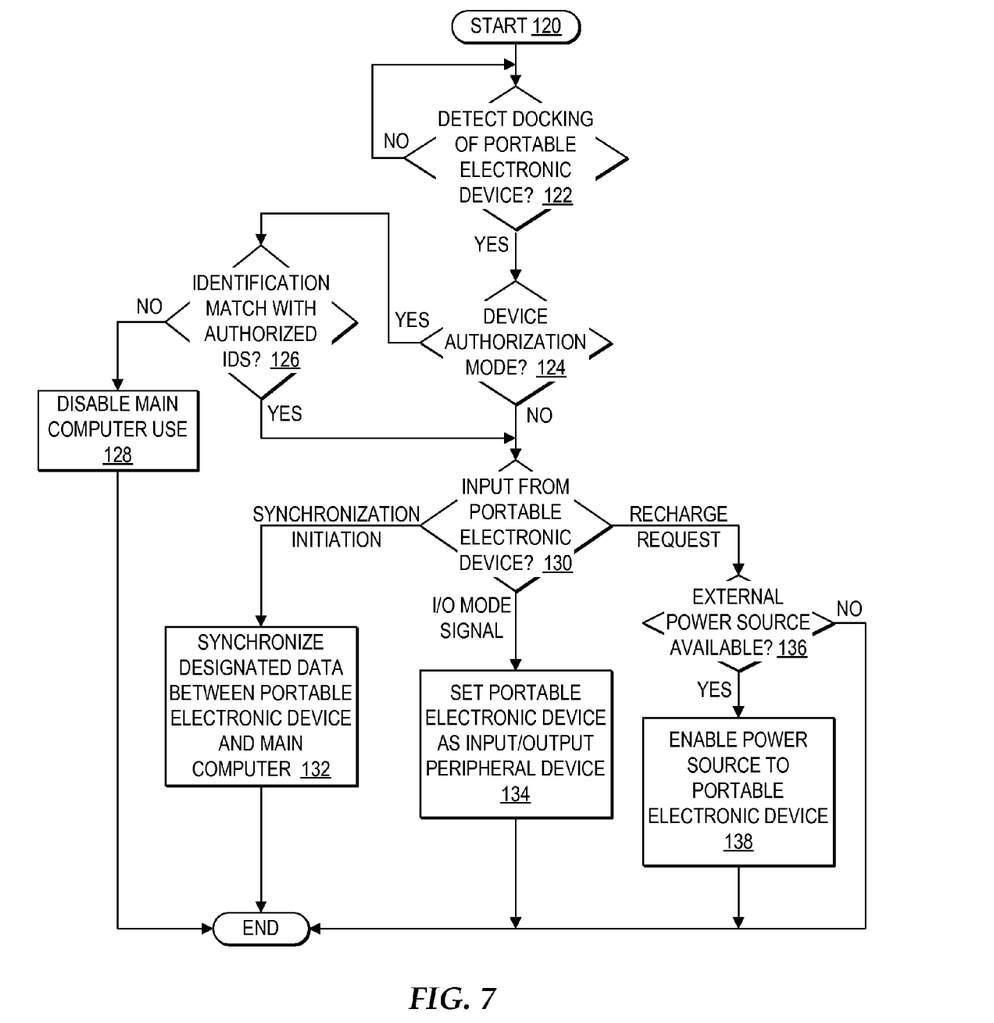
FIG. 7 depicts a high level logic flowchart of a process and program for controlling a main computer in accordance with the method, system, and program of the present invention.

Referring now to FIG. 7, there is illustrated a high level logic flowchart of a process and program for controlling a main computer in accordance with the method, system, and program of the present invention. As depicted, the process starts at block 120 and thereafter proceeds to block 122. Block 122 illustrates detecting the docking or connection with a portable electronic device. The process iterates at block 122 until a docking or connection with portable electronic device is detected, then the process passes to block 124. Block 124 depicts a determination as to whether the computer system is operating in device authorization mode. If the computer system is operating in device authorization mode, then the process passes to block 126; otherwise the process passes to block 130.

Block 126 illustrates a determination as to whether the device identification matches with the authorized identifications. Device identification may be performed by matching the security identification of the processor within the portable electronic device to the authorized identifications. In another example, a user may be required to provide a biometric input that matches with the authorized biometric identifications. If the identification does not match, then the process passes to block 128 and main computer use is disabled. Alternatively, if the identification does not match, use of certain software and data within the main computer may be blocked. If the identification does match, then the process passes to block 130.

Block 130 depicts a determination as to what type of input is received from the portable electronic device when an input is received. If a synchronization initiation signal is received, then the process passes to block 132 and the main computer initiates a synchronization of designated data between the portable electronic device and main computer, and the process ends.

At block 130, if an input/output mode set signal is received, then the process passes to block 134. Block 134 illustrates setting the portable electronic device as an input/output peripheral device to the main computer, and the process ends. Inputs received from the portable electronic device will then be received as inputs for controlling the main computer. The main computer can output data to portable electronic device for output via an output device of the portable electronic device.

In addition, at block 130, if a recharge request is received, then the process passes to block 136. Block 136 depicts a determination as to whether an external power source is available to the main computer or if sufficient power is available to charge the battery of the portable electronic device from the power source of the main computer. If the power source is not available, then the process ends. If the power source is available, then the process passes to block 138. Block 138 illustrates enabling a power source to the portable electronic device, and the process ends.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular types of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A first computer system, comprising:
    a first controller comprising a first processor and memory configured to:
    dock a second independent computer system in a first computer system;
    receive an input to said second independent computer system as an input for controlling said first computer system when said second independent computer system is docked in said first computer system;
    synchronize data between said first computer system and said second computer system when said second independent computer system is docked in said first computer system;
    said second independent computer system further comprising a microphone for detecting speech by a user;
    said second independent computer system comprising a second controller configured to:
    match the speech with a particular voice entry from among a plurality of voice entries stored on said second independent computer system, wherein each of said plurality of voice entries is associated with a separate name of a user; and
    when said second independent computer system is docked, send a particular name associated with said particular voice entry to said first computer system as an input to said first computer system for said first computer system to match with a particular messaging address and initiate a network based communication to said particular messaging address, wherein when said second independent computer system is undocked, said speech input received at said second independent computer system is utilized to control dialing of a phone number associated with said particular voice entry by said second computer system.

2. A method for controlling a first computer system, comprising:
    docking a second independent computer system in a first computer system;
    receiving an input to said second independent computer system as an input for controlling said first computer system when said second independent computer system is docked in said first computer system;
    synchronizing data between said first computer system and said second computer system when said second independent computer system is docked in said first computer system;
    detecting speech captured by a microphone at the second independent computer system;
    matching the speech at the second independent computer system with a particular voice entry from among a plurality of voice entries stored on said second independent computer system, wherein each of said plurality of voice entries is associated with a separate name of a user;
    responsive to detecting said second independent computer system docked into said first computer system, sending a particular name associated with said particular voice entry to said first computer system as an input to said first computer system for said first computer system to match with a particular messaging address and initiate a network based communication to said particular messaging address; and
    responsive to detecting said second independent computer system undocked from said first computer system, utilizing said speech input received at said second independent computer system to control dialing of a phone number associated with said particular voice entry by said second independent computer system.

3. The method for controlling a first computer system of claim 2, further comprising:
    sending an output signal from said first computer system to said second independent computer system as an output signal to an output interface of said second independent computer system when said second independent computer system is docked in said first computer system.

4. The method for controlling a first computer system of claim 2, wherein receiving an input to said second independent computer system as an input for controlling said first system further comprises:
    translating said input to said second independent computer system from a handwritten symbol detected on a handwriting recognition surface of said second independent computer system into a character input recognizable by said first computer system.

5. The method for controlling a first computer system of claim 2, further comprising:
    only allowing operation of said first computer system if said second independent computer system is docked.

6. The method for controlling a first computer system of claim 2, further comprising:
    only allowing access to a selection of software and data on said first computer system when said second independent computer system is docked.

7. The method for controlling a first computer system of claim 2, further comprising:
    only allowing operation of said first computer system if a user passes the security requirements for use of said second independent computer system through at least one input entered through an input interface of the second independent computer system.

8. A computer program product comprising a non-transitory computer readable storage medium having stored thereon a computer readable-program for controlling a first computer system, wherein the computer-readable program when executed on a computer cause the computer to:
    dock a second independent computer system in a first computer system;
    receive an input to said second independent computer system as an input for controlling said first computer system when said second independent computer system is docked in said first computer system; and
    synchronize data between said first computer system and said second computer system when said second independent computer system is docked in said first computer system.
    detect speech captured by a microphone at the second independent computer system;

match the speech at the second independent computer system with a particular voice entry from among a plurality of voice entries stored on said second independent computer system, wherein each of said plurality of voice entries is associated with a separate name of a user;

send a particular name associated with said particular voice entry to said first computer system as an input to said first computer system for said first computer system to match with a particular messaging address and initiate a network based communication to said particular messaging address, in response to detecting said second independent computer system docked into said first computer system; and utilize said speech input received at said second independent computer system to control dialing of a phone number associated with said particular voice entry by said second independent computer system, in response to detecting said second independent computer system undocked from said first computer system.

* * * * *